(12) United States Patent
Calvin et al.

(10) Patent No.: US 6,241,918 B1
(45) Date of Patent: Jun. 5, 2001

(54) PROCESS OF MANUFACTURING CONTACT LENSES IN AMBIENT ENVIRONMENT

(75) Inventors: Olin W. Calvin; John B. Enns, both of Jacksonville, FL (US); Ture Kindt-Larsen, Holte (DK)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/222,266

(22) Filed: Dec. 28, 1998

(51) Int. Cl.[7] .................................................. B29D 11/00
(52) U.S. Cl. ............................................... 264/1.1; 264/2.5
(58) Field of Search ..................... 264/1.1, 1.36, 264/1.38, 2.5, 85, 102; 425/808

(56) References Cited

U.S. PATENT DOCUMENTS

| | | |
|---|---|---|
| 3,391,589 | 7/1968 | Bishop . |
| 3,822,089 | 7/1974 | Wichterle .............................. 351/160 |
| 4,054,624 * | 10/1977 | Le Boeuf et al. .................... 264/102 |
| 4,209,605 | 6/1980 | Hoy et al. .............................. 528/54 |
| 4,620,954 | 11/1986 | Singer et al. .......................... 264/1.4 |
| 4,786,444 * | 11/1988 | Hwang ................................. 264/1.36 |
| 5,362,767 | 11/1994 | Herbrechtsmeier et al. ......... 523/106 |
| 5,466,147 * | 11/1995 | Appleton et al. ..................... 425/808 |
| 5,540,543 | 7/1996 | Lust et al. ............................. 414/786 |
| 5,555,504 | 9/1996 | Lepper et al. .................. 364/465.22 |
| 5,569,364 | 10/1996 | Hooper et al. ........................ 204/455 |
| 5,597,519 | 1/1997 | Martin et al. ........................ 264/1.38 |
| 5,620,954 | 4/1997 | Maloy ..................................... 514/12 |
| 5,656,210 | 8/1997 | Hill et al. .............................. 264/2.6 |
| 5,681,510 | 10/1997 | Valint, Jr. et al. ..................... 264/2.5 |
| 5,690,865 | 11/1997 | Kindt-Larsen et al. ............. 264/1.38 |
| 5,702,717 | 12/1997 | Cha et al. ............................. 424/425 |
| 5,731,365 | 3/1998 | Engelhardt et al. ................. 523/206 |
| 5,744,357 | 4/1998 | Wang et al. .......................... 425/347 |
| 5,753,150 | 5/1998 | Martin et al. ......................... 264/2.5 |

\* cited by examiner

Primary Examiner—Mathieu D. Vargot

(57) ABSTRACT

A method of casting polymer contact lenses between two mold halves in an ambient (air) environment containing molecular oxygen ($O_2$) in which the mold halves forming the cast geometry are exposed to the environment where the air exposure time, the time between which the injection mold used to form the mold halves is opened until the mold halves are assembled is less than 70 seconds, more preferably 40 seconds or less, and most preferably 24 seconds or less.

20 Claims, 6 Drawing Sheets

FIG. 1 Lens Base Curve Radius (mm)

FIG. 2 Lens Base Curve Radius (mm)

FIG. 3  Lens Base Curve Radius (mm)

FIG. 4  Lens Base Curve Radius (mm)

PROCESS OF MANUFACTURING CONTACT LENSES IN AMBIENT ENVIRONMENT

FIELD OF THE INVENTION

The invention relates to the manufacture of polymer contact lenses in an environment that does not require special gases.

BACKGROUND OF THE INVENTION

The molding of hydrophilic contact lenses is known. Various processes are disclosed in U.S. Pat. No. 4,495,313, to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art and other references generally disclose a contact lens production process wherein each lens is molded from a reactive monomer or prepolymer mixture. The molding is done by a casting process in which the mixture to be polymerized is deposited into one first mold half, often referred to as a front curve, a second mold half, often referred to as a back curve is assembled onto the first mold half, and the assembled system is subjected to conditions resulting in polymerization of the mixture into a contact lens having the shape of the cavity formed between the two mold halves. These mold halves are usually formed from transparent thermoplastics such as polystyrene or polypropylene.

If the preassembly and assembly processes are carried out in an ambient environment, with the molds being exposed to air containing molecular oxygen ($O_2$), the lenses produced sometimes are not of the desired quality. It is believed that this is due to the $O_2$ coming into contact with the surface of and permeating into the plastic mold halves. It is believed that $O_2$ on and in the plastic halves adversely affects the polymerization of the lens material. The effect of $O_2$ on the photopolymerization process to strongly inhibit radical-induced polymerization is documented. Polymerization is suppressed until $O_2$ has been consumed by reaction with radicals until the monomer is able to compete successfully with $O_2$ for initiator radicals. Two types of systems have been identified: closed and open. Both types of systems apply to the present invention.

In the closed system, no $O_2$ or a fixed amount of $O_2$ is initially present in the system and polymerization proceeds appreciably after an induction period, during which the $O_2$ is consumed by radicals. In the open system, $O_2$ diffuses into the system and polymerization occurs only if sufficient radicals are generated to successfully compete with the $O_2$. Open systems typically are systems that are open to air.

Exposing mold halves to $O_2$ before assembly of the mold halves leads to a "closed-open" system during polymerization. $O_2$ migrates into the mold by absorption creating an $O_2$ reservoir. After the induction period when $O_2$ in the monomer is consumed, polymerization proceeds in the lens bulk with no measurable effect from the $O_2$ initially present. However, at the lens/optical mold surface interface (lens surface), some of the $O_2$ absorbed into the mold now migrates back to that surface where it affects polymerization for a period extending beyond the induction period and causes the surface properties of the lens to differ from the bulk properties of the lens. The duration of this period and the extent to which it causes a measurable effect on lens properties is dependent on the amount of $O_2$ absorbed into the mold prior to assembly when the system is "closed".

The effect of $O_2$ absorbed onto or into the mold on photopolymerization of the reactive mixture is expected to disrupt polymerization at the lens surface, i.e. to cause differential polymerization at the lens surface relative to the lens bulk. This disruption causes more loose polymer ends at the surface due to (premature) termination of polymerization by $O_2$. These shorter chain polymers at the surface of the lens tend to have lower cross link density, less chain entanglement, and more tackiness than the polymer chains in the bulk of the lens. These factors result in reduced mechanical strength and increased water content at the lens surface relative to these properties in the lens bulk.

Under oxygen-free molding conditions, lenses are isotropic in nature. As $O_2$ is introduced to the lens surface and not to the lens bulk during polymerization, lenses become less isotropic in nature and more anisotropic, and control of final lens properties within specified tolerance ranges is compromised.

To reduce the deleterious effect of $O_2$, contact lens manufacture has been carried out in a reduced $O_2$ environment, and/or the reactive mixture is treated to remove dissolved $O_2$ prior to polymerization. In manufacturing, this has resulted in the use of techniques such as physical enclosure of the process and use of large quantities of nitrogen to blanket the assembly and pre-assembly areas. This technique includes the plastic mold halves within the blanketed area since the boundary layer of gases on the plastic surfaces will include $O_2$ if not so protected.

Various techniques for reducing the deleterious effects of $O_2$ on the polymerization of contact lenses are found in the following U.S. Pat. Nos.:

| | |
|---|---|
| 5,362,767 | Herbrechtmeier, et al |
| 5,391,589 | Kiguchi, et al |
| 5,597,519 | Martin, et al |
| 5,656,210 | Hill, et al |
| 5,681,510 | Valint, Jr., et al |

EP Appln. No. 95937446.3 discloses a process in which plastic molds are treated prior to dosing with the reactive monomer mix to remove substantially all of the $O_2$. The removal of the $O_2$ can be accomplished by contacting the mold pieces with an inert gas or by using a vacuum. Molds that were not treated to remove the $O_2$ provided contact lenses with high percentages of defects.

The use of an inert gas, such as $N_2$ gives rise to a safety hazard since an inert gas requires elaborate sensing and alarming capability to protect personnel. Further, if the amount of inert gas surrounding the manufacturing equipment decreases for any reason, all the mold halves and lenses in that area of the line are discarded. Additionally, start-up after opening the inert gas enclosure requires time to "blow down", or reach an acceptable $O_2$ level, before the product can be produced.

As would be expected, the use of $N_2$, or other inert gas, adds cost and complexity of added equipment to the manufacturing process. It also adds time to the production cycle. Therefore, it would be desirable to be able to mold the lenses without the need of excess $N_2$ or other inert gas.

By eliminating $N_2$ or other inert gas from lens production, cost savings would be realized. Not only the cost of the gas, but also the cost of plumbing and control valves, compressed air plumbing and control valves, $O_2$ process sensors, and inert gas safety sensors would be eliminated. The cost of calibrating and maintaining the process sensors and safety sensors would be eliminated. Lens production software control would be simplified with the elimination of inert gas plumbing, compressed air plumbing, process sensors, and control valves thereby providing a double benefit of not only initial development cost savings, but also operational cost savings and material savings. Also, elimination of the inert gas buffer would reduce equipment complexity and eliminate the associated work in progress problem, and would allow for further process simplification by minimizing the time from injection molding to assembly. Overall production line size would be significantly reduced.

BRIEF DESCRIPTION OF THE INVENTION

During testing of high speed contact lens manufacturing processes, it was discovered that the deleterious effect on lens polymer properties due to exposing plastic mold halves of the contact lens mold to air did not occur if air exposure time of the optical surfaces of the plastic mold halves was not more than 70 seconds. The air exposure time is established from the opening of the injection molds used to make the plastic mold halves (exposing the plastic mold halves to ambient air) to the dosing or placing the polymerization mixture in the mold halves and sealing the polymerization mixture and two optical mold surfaces away from air. In the preferred embodiment, the polymerization mixture is placed in a front curve (mold half) and the back curve (mold half) is placed onto the front curve which closes the contact lens mold, in the preferred embodiment referred to as the lens mold assembly, with the reactive mixture contained therein. When the lens mold assembly is closed the polymerization mixture and two optical mold surfaces are no longer exposed to air. It has been found that satisfactory contact lenses can be made if the air exposure time prior to dosing and closing or sealing the contact lens mold is not more than 70 seconds, preferably not more than 40 seconds, and most preferably not more than 24 seconds. Lens properties and process yields deteriorate as air exposure time increases, with air exposure times in excess of 300 seconds producing few, if any acceptable lenses.

By practicing the invention, an $N_2$ blanket is no longer required to eliminate dimensional oxidation reactions. This eliminates the need for $N_2$ and eliminates the risk of asphyxiation of operators. It simplifies the process by reducing product quality problems and increases process efficiency.

OBJECTS OF THE INVENTION

It is an object of the invention to provide a process of manufacture of polymer contact lenses without using a special gaseous environment, but still produce quality lenses.

Another, object is to provide a process of manufacture of polymer lenses in a contact lens mold without using an inert gas, thereby eliminating the need for special equipment and the associated cost.

Another object is to provide for a faster process for producing contact lenses. Yet another object is to provide a method of manufacture of polymer contact lenses in polymer, e.g. plastic, molds in which the time of exposing the surfaces of the mold halves to air is limited to eliminate the need for carrying out the process in an inert gas environment.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
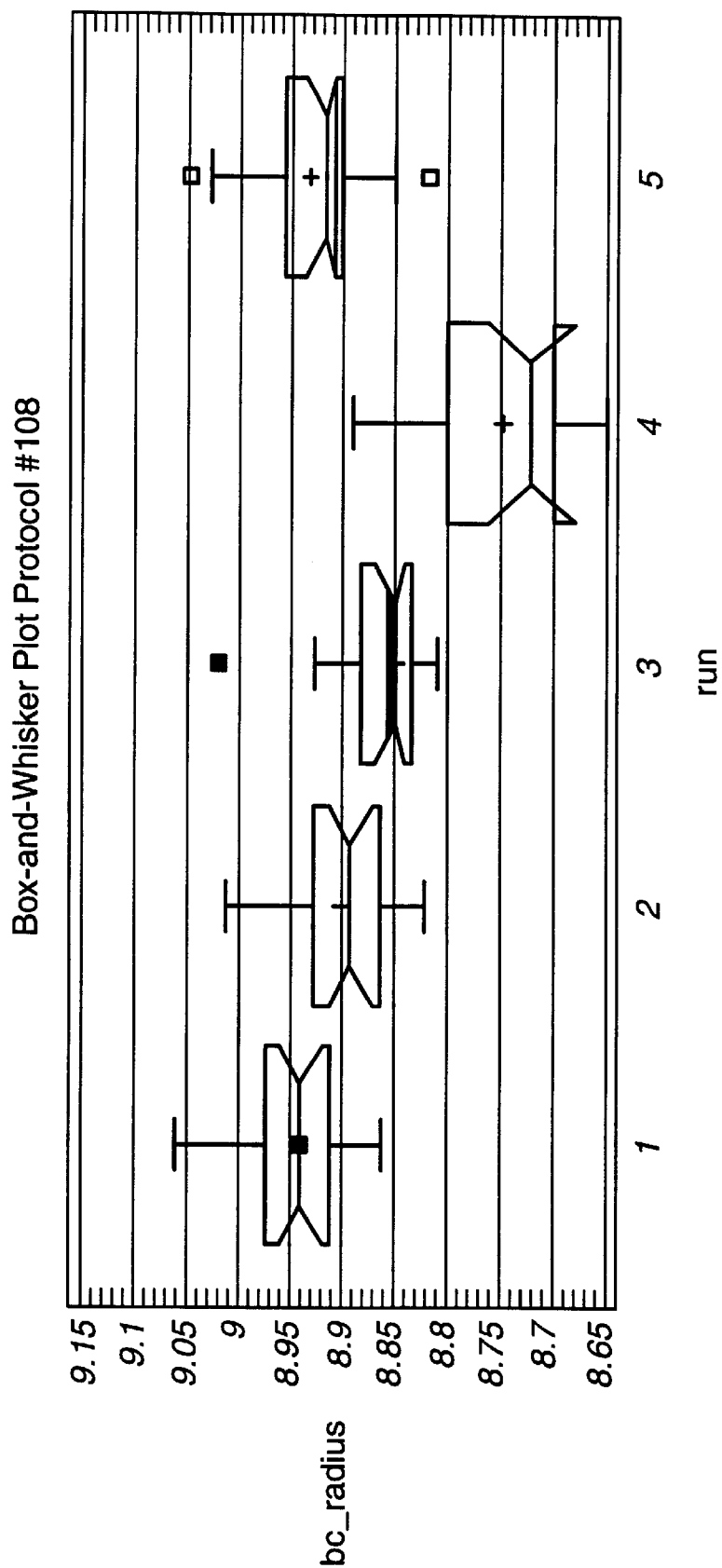
FIGS. 1–4 are box and whisker plots showing the effect on the base curve radius of contact lenses made during different runs of several test protocols with the mold halves exposed to air for different time periods.

The invention relates to a process for manufacturing polymer contact lenses in molds. The material for the lenses is any suitable reactive monomer or prepolymer mixture. The contact lens molds can be one or more piece molds. For simplicity, the preferred embodiment will be described herein, however, the contact lens molds can take any form. In the preferred embodiment, the contact lens molds comprise a front curve and back curve which are typically of plastic, e.g. polystyrene, polypropylene, or the like. Polystyrene is the preferred plastic. The front curve and back curve are preferably made in one or more injection molding machines, in injection molds. After the front and back curves are made, the lens is cast molded in a cavity formed when the front and back curves are assembled together (closed) to form a lens mold assembly. The front and back curves are assembled with the reactive mixture used to form the lens within the cavity. Polymerization, typically photopolymerization of the reactive mixture takes place with the front and back curves assembled, and then the front and back curve assembly is opened to remove the lens. The assembly and pre-assembly processes are carried out at normal processing temperatures, for example 50° F. to 98° F. The time of interest is that during which the inside surfaces of the front and back curves are exposed to air. In the preferred embodiment this time is the time that the one or more injection molds in the one or more injection molding machines is opened to remove the front and back curves until the time that the front and back curves are assembled with reactive monomer mixture contained within the closed lens mold assembly. The preferred injection molding machine and injection molds used to make the front and back curves of the contact lens mold are described in concurrently filed, "Mold and Molding Machine for Making Ophthalmic Devices", U.S. Ser. No. 09/305,886, entirely incorporated herein by reference.

In an alternative and less preferred embodiment, in which contact lens mold halves are pre-made and stored in an inert gaseous environment prior to introducing them into a contact lens manufacturing line, the time of interest is again during which the mold halves are removed from the inert gaseous environment until the time the mold halves are assembled with reactive mixture contained within the cavity thereby produced.

In other alternative embodiments, the molds can be reusable molds made from durable materials, such as, glass or polymers.

The reactive monomer mixture or prepolymer material used to form the contact lens in the process of this invention can comprise any lens polymerizable or cross-linkable material which undergoes an oxygen-sensitive reaction, e.g. a free radical reaction. The reactive monomer mixture can be degased or nondegased. For example, the acrylic or methacrylic monomer system of U.S. Pat. No. Re. 27,401, which is a combination of an acrylic or methacrylic acid monoester with a minor amount of a diester of acrylic or methacrylic acid can be utilized in the present invention. Also disclosed in U.S. Pat. No. Re. 27,401, are the monoesters are hydrophilic hydroxy esters of acrylic or methacrylic acids and a polyhydric alcohol. Similarly, polymerization systems in which vinyl, acrylic or methacrylic monomers are copolymerized with such materials as hydroxyethyl acrylate, vinyl pyrrolidone, acrylaminds, or the like can be used. As examples: polyvinyl alcohol, hydroxyethylmethacrylate, methylmethacrylate, hydroxypropylmethacrylate, glycidylmethacrylate, diacetoneacrylamide or vinyl acetate can be used in combination with acrylamide, hydroxyethylacryulate, acrylic acid, or glycerylmethacrylate, and dimethylamino ethyl acrylate.

At present, it is preferred that the polymerizable acrylic monomer is hydroxy ethyl methacrylate (HEMA) and most preferably, the polymerizable acrylic monomer is a combination of a major portion of HEMA combined with a minor portion of another monomer, which is preferably methacrylic acid (MAA).

A small amount of a crosslinking agent with a functionality of 2 or greater may be added to the monomer or monomer mixture. An example of a preferred crosslinking agent is ethylene glycol dimethacrylate, and 1,1,1-trimethyloly propane trimethacrylate (TMPTMA). The contact lenses made by the process of this invention are preferably hydrogels which comprise 40–75% water.

The manufacturer and user of contact lenses is concerned primarily with the lens power (diopters) and the sagital height (mm). The sagital height or sag is a function of the lens diameter and base curve radius. The lens power determines the optical correction and the sag determines the fit of the lens on the eye.

In the manufacture of contact lenses, the contact lens molds are formed to address four physical lens parameters, these being diameter, base curve radius (the radius of curvature of the lens surface to be adjacent the eye), front curve radius (the radius of curvature of the lens surface to be non-adjacent the eye) and center thickness. All of these parameters are measured in millimeters. The lens power is a function of the difference in base curve radius and front curve radius. The base curve radius is a most important factor, because it is involved not only with optical correction but also with the fit of the lens on the eye.

In manufacturing contact lenses on a production basis, the contact lens mold, in our preferred mode, the mold halves are designed to set the lens dimensions for diameter, base curve radius, front curve radius, and center thickness. The dimensional specifications have allowed tolerances, both plus and minus. A given population of lenses is considered to be satisfactory and within specification if the mean value and standard deviation (SD) of a random sample of said population have values such that, when conventional statistical techniques are applied, a low percentage of non-conformance to the specification(s) is calculated. Typically, this percentage is less than 2.5%. An acceptable SD for base curve radius is 0.05 mm, or less.

In order to produce contact lenses that are considered to be satisfactory, environmental and process conditions, or factors, that effect lens properties must be identified and controlled sufficiently to ensure that lenses are produced not only within specification but also with a low percentage of non-conformance to that specification. During testing of high speed contact lens manufacturing processes, it was discovered that molecular oxygen ($O_2$) associated with the plastic front curves and back curves is an environmental factor that has a deleterious effect on lens base curve radius. It is hypothesized that $O_2$ associated with the mold halves is a factor because it causes the surface properties of the lens to differ from the bulk properties of the lens as discussed earlier herein. The extent to which this factor affects lens base curve radius is directly related to the amount of $O_2$ absorbed into the mold halves before assembly. The amount of $O_2$ of most concern is that amount of $O_2$ that might become available during polymerization to the polymerizing surfaces of the reactive mixture adjacent to the optical surfaces of the mold halves. The optical surfaces of the contact lens mold are the inside surfaces of the mold which define the shape of the contact lens.

It has been discovered that the mold halves transport and assembly operations can be carried out in an ambient (air) environment in the presence of $O_2$ and still obtain proper polymerization of the lens material as determined by achieving the lens release acceptance criteria by limiting the time during which the mold halves are exposed to air and the $O_2$ it contains. That is, there is a time "window" during which the manufacturing process can be carried out in an air environment and satisfactory lens production results are obtained without using an inert gas. This time has been found to be not more than 70 seconds, preferably not more than 40 seconds, and most preferably not more than 24 seconds.

To determine the time window, a number of protocol tests were carried out. In the tests of each of the protocols, a number of lenses were made with the plastic mold halves exposed to ambient (air) environment for a given time, called air exposure time. This is called a "run". Other runs were made with different air exposure times. That is, for example, if for each of five runs (different air exposure times) 100 lenses are made, that protocol would have 500 lenses.

In evaluating the results, the control was taken as the lenses produced with the shortest period of air exposure time for the protocol. This is the first and last run in each of the protocols discussed below.

The dimension of the control was measured as a reference datum for the protocol. The lenses made during the protocol for different mold opening times was compared to the mean and the SD therefrom measured.

In Protocol #108, the amount of $O_2$ associated with the polystyrene mold halves was varied by varying the time from injection mold opening to assembly of the mold halves. The following air exposure times (runs) were studied with −9.00D (diopter) (target lens power) lenses: 17.8 sec., 27.8 sec., 43.9 sec., 69.2 sec., and 17.8 sec. (corresponding to runs 1, 2, 3, 4, and 5 in FIG. 1). The times were monitored manually and only plastic molds produced at steady-state (non-interrupted operation) were allowed to be processed. Degassed, tinted 1-Day Acuvue® monomer was used for the lens material. An 18 sec. precure time was used with an 8 mW/cm$^2$ irradiance (power per unit area) as measured with an IL1350 radiometer and XRL140A detector (both of which are manufactured by International Light Inc.). A 120 sec. cure time was used with a 630 mJ/cm$^2$ dosage (energy per unit area) as measured with an IL390B light bug (manufactured by International Light Inc.). This device automatically integrates the irradiance with time to yield the dosage. The curing lamp type for precure and cure was Philips TL/09. The lenses were demolded, hydrated, packaged in glass vials, equilibrated, and not sterilized. The following parameters were measured: base curve radius, diameter, center thickness, and power.

Figure 2:
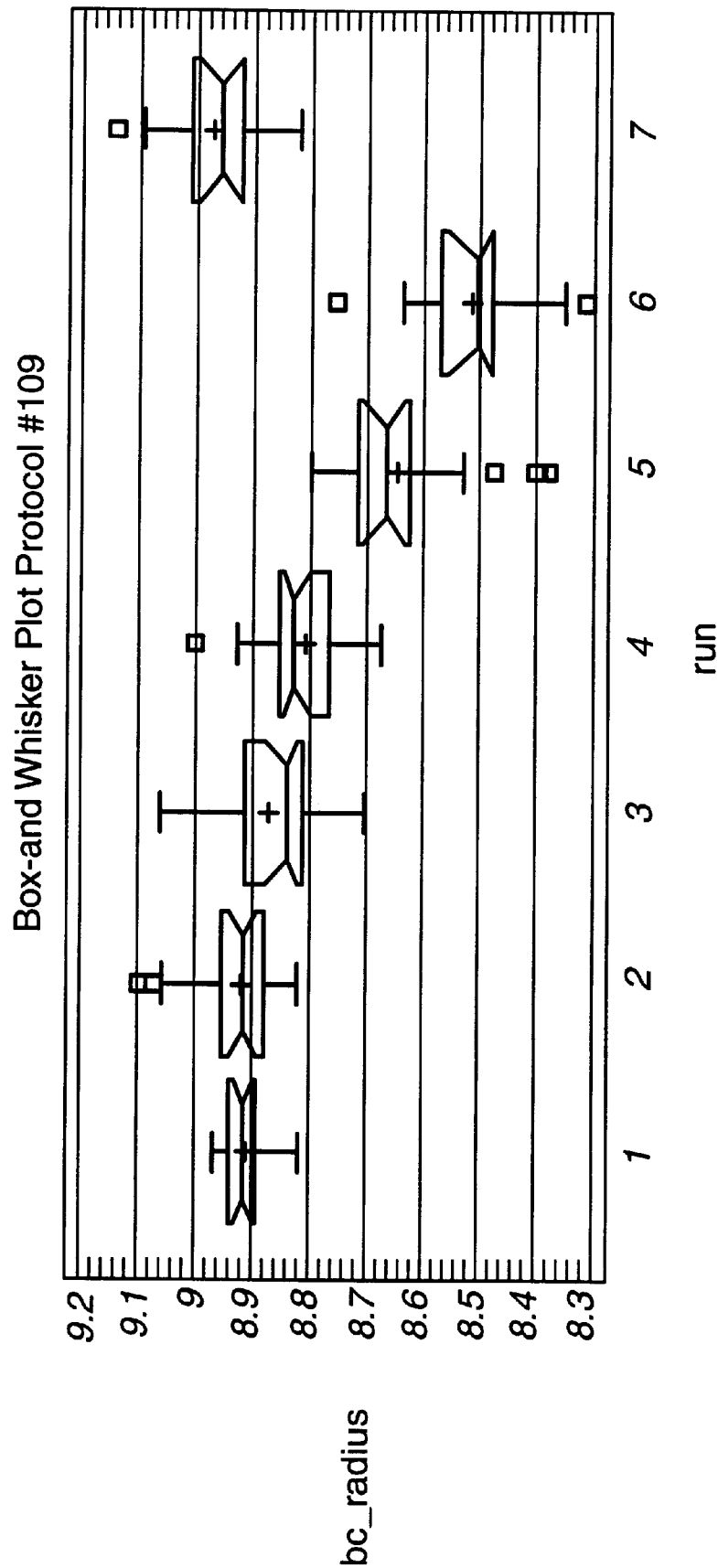

In Protocol #109, all processing conditions were identical to Protocol #108 except that the following air exposure times (runs) were studied with −9.00D (target) lenses: 23.0 sec., 34.5 sec., 52.0 sec., 77.6 sec., 116.5 sec., 262 sec., and 23.0 sec. (corresponding to runs 1, 2, 3, 4, 5, 6, and 7 in FIG. 2).

Figure 3:
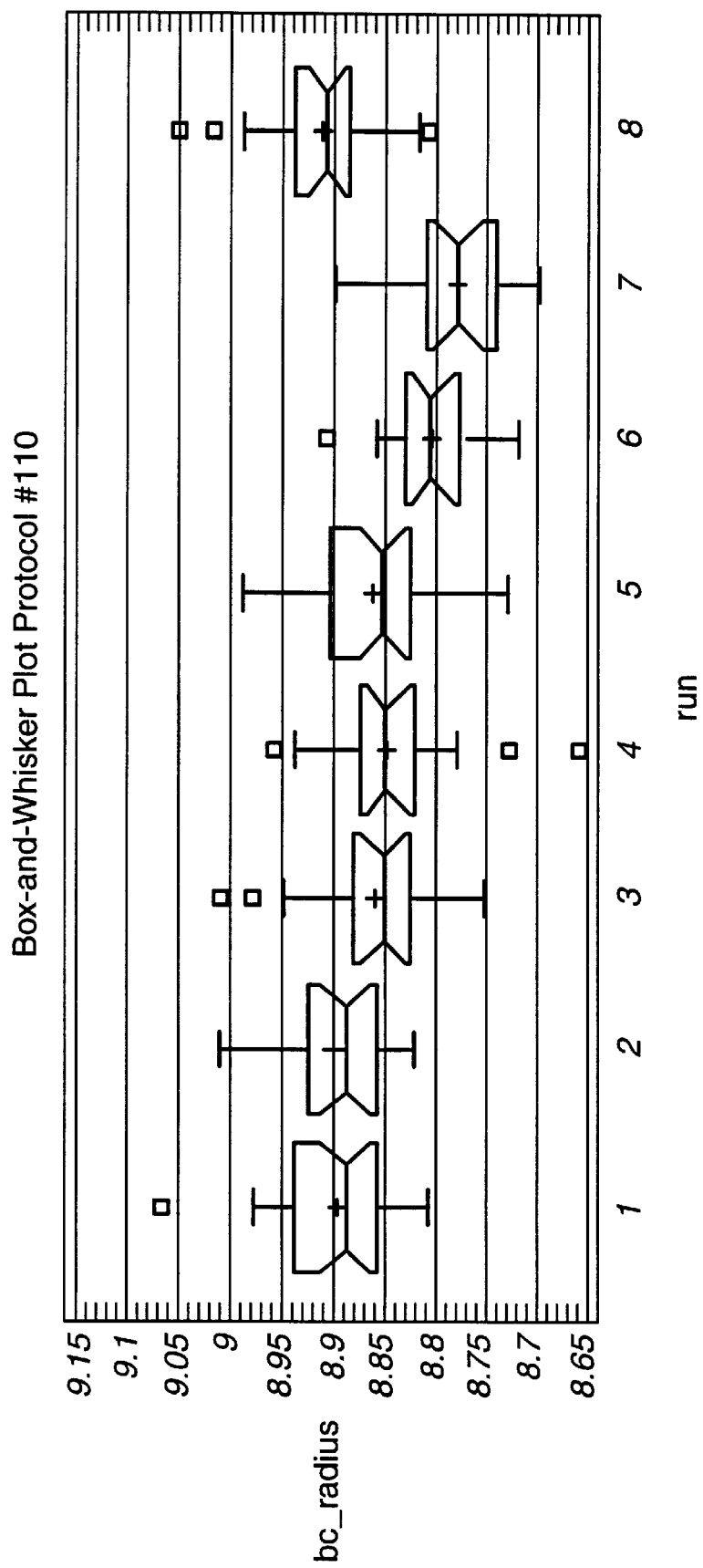

In Protocol #110, all processing conditions were identical to Protocol #108 except that the following air exposure times (runs) were studied with −9.00D (target) lenses: 17.4 sec., 23.4 sec., 29.3 sec., 39.3 sec., 49.3 sec., 59.3 sec., 69.4 sec., and 17.4 sec. (corresponding to runs 1–8 in FIG. 3).

Figure 4:
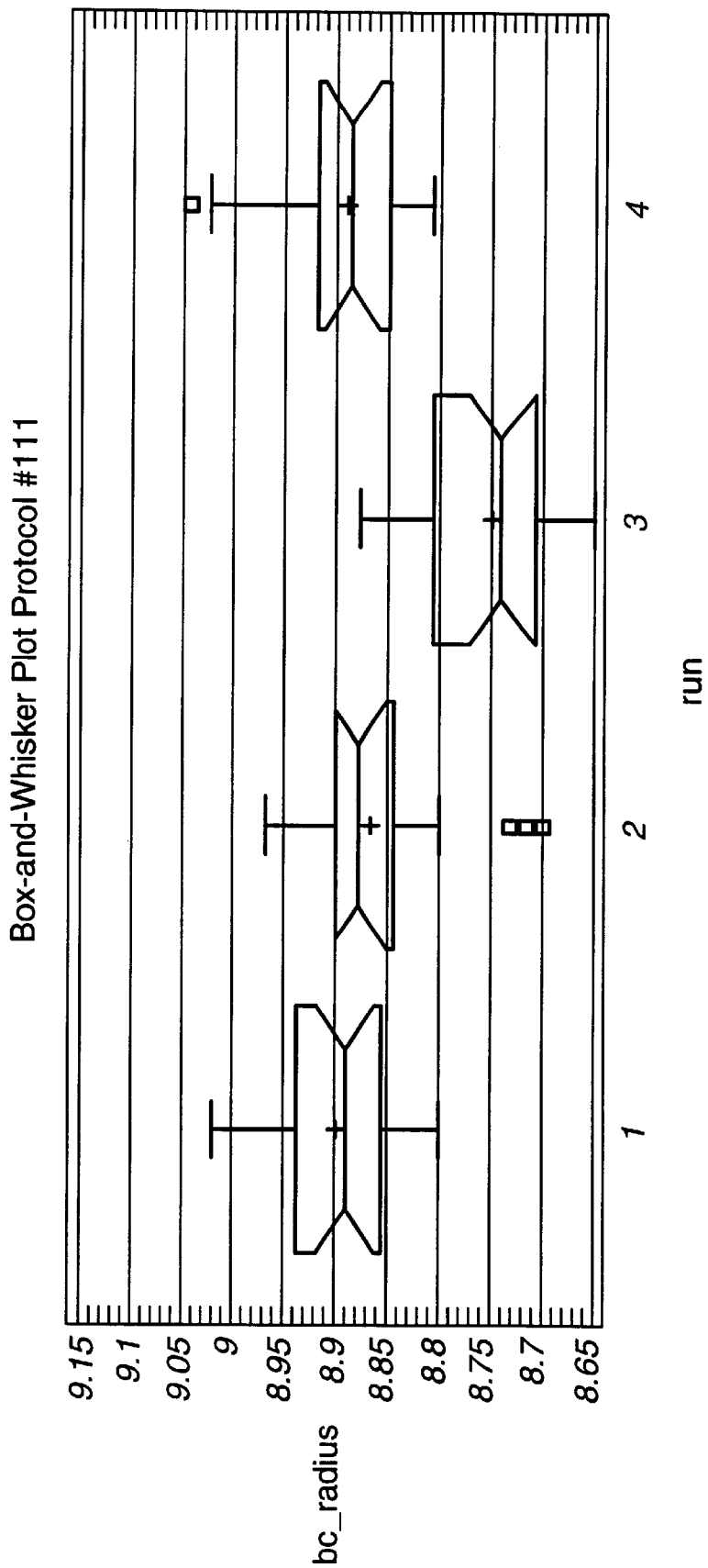

In Protocol #111, all processing conditions were identical to Protocol #108 except that non-degassed, tinted 1-Day Acuvue® monomer was used for the lens material and the following air exposure times (runs) were studied with −9.00D (target) lenses: 17 sec., 30 sec., 60 sec., and 17 sec. (corresponding to runs 1–4 in FIG. 4).

As indicated, for each of the protocols the parameters of base curve radius, lens diameter, center thickness and power were measured. The results were as follows:

Base curve radius: this is the radius of curvature of the lens surface adjacent to the eye. It is considered to be the best indicator for the effects of exposing plastic molds to air on lens properties. FIGS. 1–4 show the results of the base curve radius of the lenses for the various runs of each of the protocols.

For Protocol 108 (FIG. 1), the design specification for the base curve radius was 8.75 to 9.15 mm. Runs 1, 2 and 3 (up to 43.9 seconds) were within the design limits.

For Protocol 109 (FIG. 2) the specification range for the base curve radius was 8.75 to 9.15 mm. Runs 1, 2, 3 and 4 (up to 77.6 seconds) were within the limits.

For Protocol 110 (FIG. 3), the base curve radius range specified was 8.75 to 9.15 mm. All of the runs (up to 69.4 seconds) were within limits.

For Protocol 111 (FIG. 4), the specification range for the base curve radius was 8.75 to 9.15 mm. Runs 1 and 2 (up to 30 seconds) were within limits and run 3 (60 seconds) was substantially within limits. This experiment demonstrated that the results were similar for degased or nondegased reactive mixture. The nondegased reactive mixture does not deleteriously affect the lens properties, because the $O_2$ in the mixture is consumed uniformly throughout the lens during the induction period.

Limits are selected as somewhat lower than the maximum as a reasonable engineering and processing compromise.

As seen from the Figures, the process is substantially effective (produces lenses with a base curve radius within the design range) up to 70 seconds, more effective at about 40 seconds and below, and most effective at 24 seconds and below. That is, at times up to 24 seconds, there will be more lenses that are acceptable (closer to the middle of the specification range), at up to 40 seconds, somewhat fewer acceptable lenses, and at up to 70 seconds, the least amount of acceptable lenses.

As to the other parameters:

Lens center thickness is also a specified dimension range which the mold is designed to produce. In general, the center thickness tends to decrease with increasing air exposure time, but within the times of the window, the parameter was within design limits.

Lens power, rated in diopters, is the amount of optical correction provided by the lens. It is related to the difference in base curve radius and front curve radius. With increasing air exposure time, the power decreased (more correction). In all of the protocols, the amount of change over the range of air exposure times was substantially within the same range produced by the controls, and the lenses were generally acceptable.

Lens diameter is a specified dimension range. That is, the front curves and back curves are designed to produce a lens having a certain diameter. In all of the protocols, the lenses produced were within the limits specified and there was no significance in the standard deviation from the design over the broad range of air exposure times.

Figure 5:
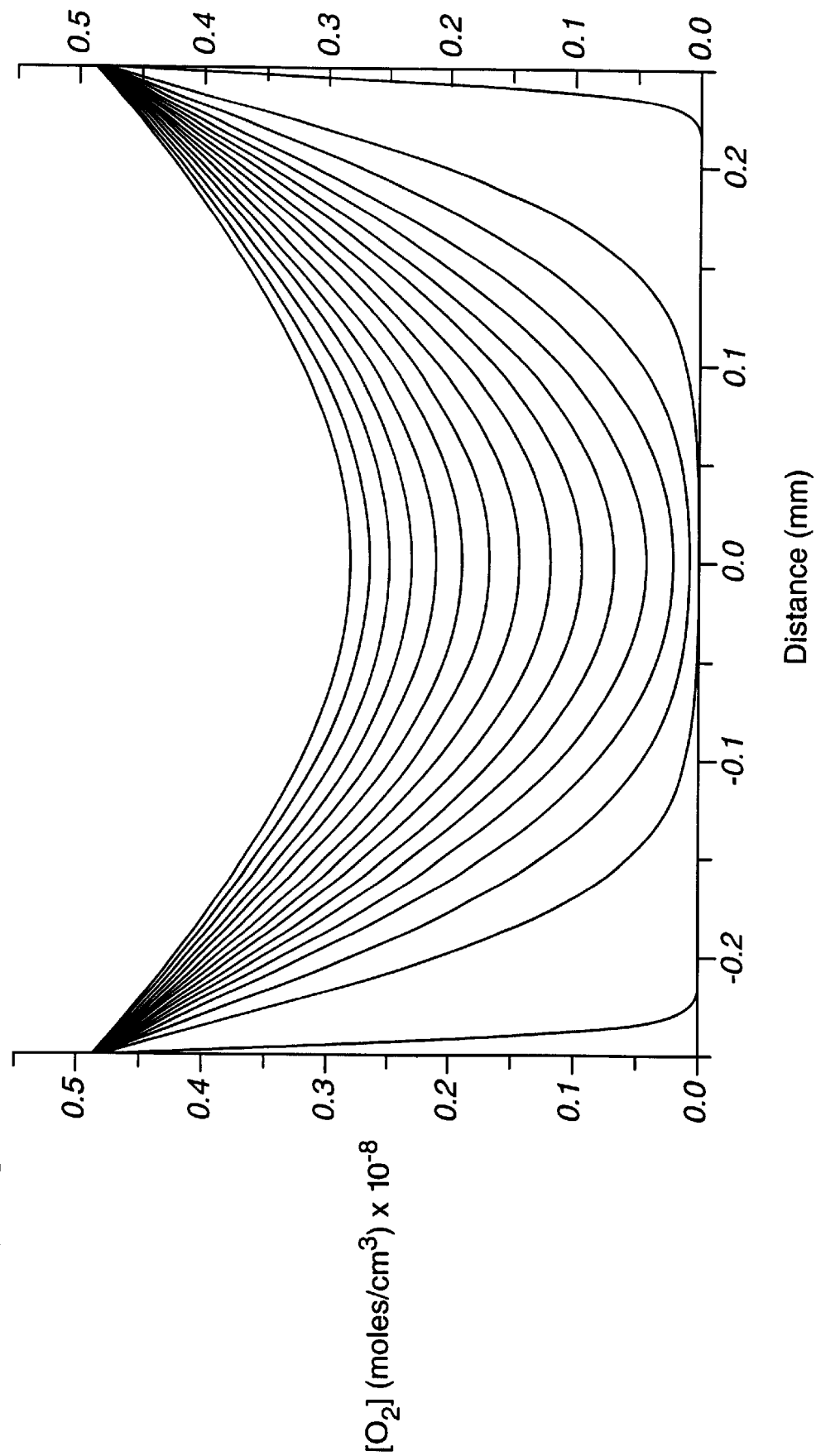
FIG. 5 is a graph of the $O_2$ concentration in a 0.5 mm thick polystrene mold half as a function of position across the thickness of the mold half where 0 represents the middle of the thickness of the mold half.

Once the exposure time is measured, the amount of $O_2$ absorbed into a unit cross-sectional volume of the mold halves can be determined because it is a function of the permeability of the mold material, the mean thickness (L) of said volume as measured perpendicular to the surfaces exposed to $O_2$, the concentration gradient of $O_2$, and the amount of time the mold halves are exposed to $O_2$. Permeability (p) is defined as the product of diffusivity (D) and solubility (k): $p = D*k$. Diffusivity and solubility are both functions of temperature and front and back curve mold materials. The diffusivity of $O_2$ in polystyrene at room temperature (25 C) is $1.1 \times 10^{-7}$ cm$^2$/sec. The solubility of $O_2$ in polystyrene at room temperature (25 C) is $5.5 \times 10^{-2}$ cm$^3$(STP)/(cm$^3$bar), or $2.45 \times 10^{-6}$ moles/(cm$^3$bar). If the temperature and materials are fixed, then the amount of $O_2$ of most concern at any given time simplifies to a function of thickness, $O_2$ concentration gradient and time. If the thickness and concentration gradient are fixed, then this amount of $O_2$ becomes a function of time. The thickness is fixed by back curve and front curve mold geometry. The concentration gradient is fixed by assuming that the front curve and back curve material (e.g. polystyrene) is essentially degassed during the injection molding process, and by knowing or controlling the $O_2$ concentration of the environment surrounding the mold halves. The total amount of $O_2$ of most concern is then calculated by knowing the exposure time to $O_2$ and by summing the total number of unit volumes making up the optical surfaces of the mold halves and the immediate vicinity thereof. If the environment surrounding the mold halves is air, then the exposure time is known as the air exposure time. This formula was used to generate FIG. 5 which shows the amount of $O_2$ in a 0.5 mm thick polystyrene mold as a function of the position across the thickness at various times after injection molding. The lines on FIG. 5 represent various times after initial exposure. The lines from lowest to highest concentration of $O_2$ were calculated at 1 second, and from 1 minute to 15 minutes by 1 minute intervals.

Figure 6:
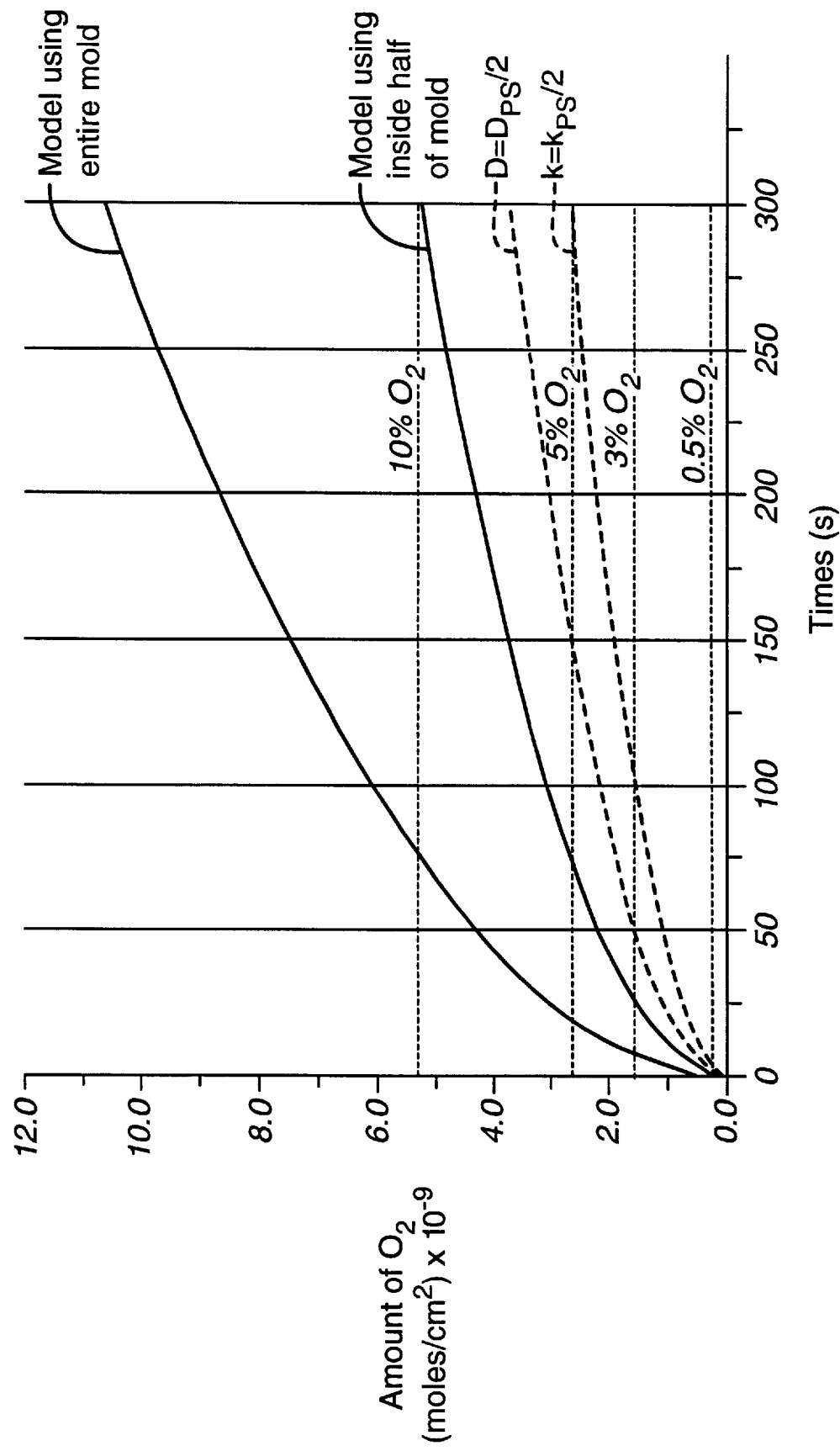
FIG. 6 is a graph of the amount of $O_2$ absorbed by a 0.5 mm thick polystrene mold half as a function of exposure time in air.

Previous experimentation showed that mold halves exposed to a 5% $O_2$ environment produced quality parts. It was determined by experimentation that the front and back curve molds described herein exposed to air absorb the equivalent amount of $O_2$ in 75 seconds as if they were exposed to an environment having a 5% $O_2$ concentration and allowed to reach equilibrium. It was further determined that only the $O_2$ absorbed by the front and back curve surfaces close to the reactive monomer mixture should be considered as available to interfere with the polymerization of the reactive monomer mixture. For our front and back curves geometry that meant that only about half of the $O_2$ absorbed in the optical region of the mold was available to interfere with the polymerization reaction. Using these assumptions based on actual experimentation, FIG. 6 was produced from which the total amount of $O_2$ available to interfere with the polymerization of the reactive monomer mixture can be determined. From FIG. 6, the amount of $O_2$ which is available to interfere with the polymerization reaction at 70 seconds is $2.5 \times 10^{-9}$ moles/cm$^2$, at 40 seconds is $1.9 \times 10^{-9}$ moles/cm$^2$, and at 24 seconds is $1.5 \times 10^{-9}$ moles/cm$^2$ for each of the surfaces of the front and back curves. FIG. 6 also shows two curves: a curve labelled $D=D_{ps}/2$ and a curve labelled $k=k_{ps}/2$. The former curve shows the amount of $O_2$ absorbed by a 0.5 mm thick material with ½ the diffusivity (D) of polystyrene and the same solubility (k) as polystyrene. The latter curve shows the amount of $O_2$ absorbed by a 0.5 mm thick material with ½ the solubility (k) of polystyrene and the same diffusivity (D) as polystyrene.

The air exposure time for a mold material other than polystyrene may be related to the air exposure time for polystyrene if the permeability of $O_2$ for that material and the thickness of the material is known. This relationship is stated as follows:

Air exposure time for NM=(Air exposure time for PS)* (D*k for PS)/(D*k for NM) Where:

NM=new material

PS=polystyrene

D=diffusivity of $O_2$ in the mold material, and k=solubility of $O_2$ in the mold material.

Thus, for a material having a solubility of $5.5 \times 10^{-2}$ cm$^3$(STP)/(cm$^3$bar) but only one-half (0.5) the diffusivity, the air exposure time for the new material equivalent to a 70 second air exposure time for polystyrene would be calculated as follows:

Air exposure time for NM=(70 seconds)*(1*1 for PS)/(0.5*1 for NM)

Air exposure time for NM=140 seconds

The exposure time may also be extended by using an inert gas, like nitrogen, in and around the injection molding region wherein the plastic mold halves are produced, for example, for pressurized gas ejection of the mold halves from the mold. The inert gas in this area would provide a boundary layer of the inert gas around the front and back curves which impedes the uptake of $O_2$ when the front and back curves mold halves are subsequently exposed thereto.

All patents, applications, publications, and the method mentioned herein are hereby incorporated by reference.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed:

1. In a method of manufacturing a contact lens, the improvement consisting essentially of the steps of:

exposing a contact lens mold comprising optical mold surfaces to air, dosing said contact lens mold with a polymerizable mixture, sealing said polymerizable mixture and said optical mold surfaces away from air, and polymerizing said polymerizable mixture, wherein said exposing step occurs for not more than 70 seconds just prior to said sealing step.

2. The method of claim 1, wherein said exposing step occurs for less than 40 seconds just prior to said sealing step.

3. The method of claim 1, wherein said exposing step occurs for less than 24 seconds just prior to said sealing step.

4. The method of claim 1, wherein before said exposing step is the step of:

injection-molding a contact lens mold comprising a front curve and a back curve whereby the exposing step begins when the injection mold opens.

5. The method of claim 1, wherein said contact lens mold comprises a front curve and a back curve, and said polymerizable mixture is placed into said front curve during said dosing step, and said sealing step is accomplished by placing said back curve onto said front curve, and further wherein said polymerizable mixture is oxygen-sensitive.

6. The method of claim 4, wherein said contact lens mold comprises plastic.

7. The method of claim 4, wherein said contact lens mold comprises polystyrene.

8. The method of claim 4, wherein said contact lens mold comprises polypropylene.

9. The method of claim 1, wherein said contact lens mold is a reusable mold.

10. The method of claim 1, wherein said polymerizable mixture is oxygen-sensitive.

11. In a method of manufacturing a contact lens, the improvement consisting essentially of the steps of:

dosing a contact lens mold comprising optical mold surfaces with an oxygen-sensitive polymerizable mixture, sealing said polymerizable mixture away from air, and polymerizing said polymerizable mixture, wherein said optical surfaces of said contact lens mold are exposed to air just prior to said sealing step, wherein said exposure to air is for less than 70 seconds just prior to said sealing step, and wherein said optical surfaces of said contact lens mold have less than $2.5 \times 10^{-9}$ moles/cm$^2$ $O_2$ available to interfere with the polymerization of said polymerizable mixture.

12. The method of claim 11, wherein said optical surfaces of said contact lens mold have less than $1.9 \times 10^{-9}$ moles/cm$^2$ $O_2$ available to interfere with the polymerization of said polymerizable mixture.

13. The method of claim 11, wherein said optical surfaces of said contact lens mold have less than $1.5 \times 10^{31\ 9}$ moles/cm$^2$ $O_2$ available to interfere with the polymerization of said polymerizable mixture.

14. The method of claim 11, wherein said contact lens mold comprises plastic.

15. The method of claim 11, wherein said contact lens mold comprises polystyrene.

16. The method of claim 11, wherein said contact lens mold comprises polypropylene.

17. The method of claim 11, wherein said contact lens mold is a reusable mold.

18. The method of claim 1, wherein said contact lens mold comprises glass.

19. The method of claim 17, wherein said contact lens mold comprises glass.

20. The method of claim 11, further comprising the step of:

sealing said polymerizable mixture and said optical mold surfaces away from air, wherein said contact lens mold comprises a material other than polystyrene, and further wherein said optical surfaces of said contact lens mold comprising said material other than polystyrene are exposed to air for a time less than or equal to (70 seconds)*(D*k for PS)/(D*k for NM)

Where:

NM=material other than polystyrene

PS=polystyrene

D=diffusivity of $O_2$ in the mold material, and k=solubility of $O_2$ in the mold material.

* * * * *